United States Patent Office 3,455,862
Patented July 15, 1969

3,455,862
DISPERSIONS IN ACRYLONITRILE
POLYMER SOLUTIONS
Robert E. Opferkuch, Jr., and Charles W. Whatley, Decatur, Ala., assignors to Monsanto Company, St. Louis, Mo., a corporation of Delaware
No Drawing. Filed Mar. 28, 1966, Ser. No. 537,636
Int. Cl. C08f 45/44, 45/46
U.S. Cl. 260—32.6         7 Claims

ABSTRACT OF THE DISCLOSURE

Acrylic fibers of more uniform quality are produced from acrylic polymer solutions containing pigment or like insoluble materials dispersed therein by the addition thereto of a hydroxypoly(ethyleneoxy)ether of an alkyl phenol which improves the homogeneity thereof. Additionally, the presence of the phenol in the solution improves the spinnability thereof.

The instant invention relates to improved acrylic polymer solutions of improved homogeneity, and to the method of preparing such improved solutions. In a specific aspect, the instant inventon provides for a method of attaining superior dispersions of pigments and like insoluble materials in acrylic polymer dope solutions, thus enabling the production of acrylic fibers of more uniform quality.

It is well known that polyacrylonitrile and copolymers of acrylonitrile and other mono-olefinic polymerizable monomers are excellent fiber-forming polymers. The polyacrylonitrile and copolymers of more than 75 percent and preferably more than 85 percent acrylonitrile and up to 15 percent of other polymerizable monomers produce fibers with superior tensile properties, desirable elongation, and excellent stability under a wide range of physical and chemical conditons.

However, in order to produce shaped articles, such as filaments, fibers, yarns, films and the like from polymers of acrylonitrile, the polymeric compositions must be dissolved in a suitable solvent since melt spinning techniques are not satisfactory with acrylonitrile polymers. A key step in the production of these acrylic polymer solutions for spinning is the formation of a polymer-solvent slurry prior to actual solutioning of the polymer in the solvent. The more homogeneous the slurry can be made, the less undissolved and gelled particles of polymer remain after the solutioning conditions have been applied. Also, inasmuch as it is often desirable to add certain insoluble materials to the acrylonitrile polymer solutions prior to spinning, it is highly desirable to effect a uniform dispersion of these insoluble materials to assure their ultimate uniform distribution in the acrylic fibers. For example, to produce anacrylic fiber of satisfactory color uniformity, the distribution of pigments in the polymer solution must be in the form of an extremely homogeneous dispersion.

Pigments such as titanium dioxide to impart whiteness or other pigments to impart color to the ultimate fiber are usually added to the spinning solution in small amounts ranging from about 0.1 to as high as 4.0 percent by weight based on the weight of the polymer. Usually titanium dioxide is added in preferred amounts of 0.1 to 1.0 weight percent. If unsatisfactory, the dispersion of pigment will result in fibers of unacceptably variable color and optical luster which, particularly in the instance of textile fibers, would be unacceptable to textile manufacturers. Improved dispersions also contribute processing advantages in that the life of filter media in the process stream is considerably extended, and fiber spinnability is significantly improved by avoiding clogging of spinning jets with agglomerated particles of polymer.

It is accordingly an object of this invention to provide novel uniform acrylic polymer spinning solutions containing a minimum of undissolved and gelled particles of polymer. It is a further object of this invention to provide improved dispersions of insoluble materials such as pigments and the like in acrylic polymer solutions. It is a further object of this invention to provide a novel method for obtaining improved solutions of acrylonitrile and improved dispersions of insoluble material in acrylonitrile polymer spinning solutions. It is a still further object of this invention to provide a novel acrylonitrile polymer spinning solution containing a small amount of a non-ionic surfactant of the alkylphenol type.

Although the novel method of this invention provides a novel polymer solution having improved dispersion of insoluble material, it is most surprising that polymer gel has been reduced to the extent experienced. When spun, occluded particles of gel in the polymer locally reduce polymer strength. Though not so significantly as to render the fiber unacceptable in its ultimate use, the localized weakening of filaments caused by gel presence results in breaks of individual filaments in the spin bath and in breaks and wraps of filaments on fiber wash rolls. This minimization of gel in the polymer as evidenced by improved spinning performance may therefore be unexpectedly achieved by adding small amounts of a nonionic surfactant of the phenolic polyakyleneoxy ether type.

In accordance with this invention improved polymer solutions and improved dispersions of insoluble materials in acrylic polyem solutions may be obtained by the addition to the solution or dispersion of small amounts, sufficient to increase dispersibilty, of a non-ionic surfactant which is a hydroxypoly(ethyleneoxy) ether of an alkyl phenol. In general the non-ionic surfactant compounds which are to be used in the present invention correspond to the general formula

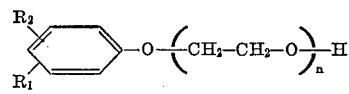

wherein $n$ is a whole integer indicating the number of repeating ethyleneoxy units, $R_1$ is an alkyl group, and is preferably in a position para to the repeating ethyleneoxy groups, and $R_2$ is hydrogen or an alkyl group, preferably in a position ortho to the repeating ethyleneoxy groups. The noni-onic surfactants which may be used in accordance with this invention may or may not be water soluble, and in general are characterized by from 2 to 30 repeating ethyleneoxy units corresponding to the integer $n$ in the above formula. The R groups in the above formula indicate branched or straight chain alkyl groups preferably containing from 5 to 15 carbon atoms. The polyethyleneoxy ethers of the nonyl phenols are highly preferred.

Specifically, the dispersing agents which are desirably employed in the practice of this invention include the alkyl and dialkyl phenoxy polyethyleneoxy ethanols such as the pentylphenoxypoly(ethyleneoxy) ethanols, the di-(neopentyl)phenoxypoly(ethyleneoxy) ethanols, the hexylphenoxypoly(ethyleneoxy) ethanols, the 2-ethylhexylphenoxypoly(ethyleneoxy) ethanols, the di(2-ethylhexyl)phenoxypoly(ethyleneoxy) ethanols, the octylphenoxypoly(ethyleneoxy) ethanols, the nonylphenoxypoly-(ethyleneoxy) ethanols, the dodecylphenoxypoly(ethyleneoxy) ethanols, and the like, which preferably contain from 2 to 30 repeating ethyleneoxy units.

The surfactants of this invention are desirably used in small quantities sufficient to exert a beneficial dispersing effect in the polymer solution. Generally, the surfactants are employed in amounts ranging from about 0.1 percent to 2 percent based upon the weight of the polymer in solution. Satisfactory results may be obtained by utilizing the surfactant in amounts ranging from 0.1 percent to 1 percent by weight of the polymer in solution.

The non-ionic surface active agents employed in this invention may be added to the acrylic polymer solutions in various ways at any one of several junctures of the process prior to spinning. For example, the dispersing agent may be metered directly into the solvent prior to the addition of the polymer. In such an instance, the surfactant will aid in homogenizing the slurry, thus enabling preparation of a polymer solution with less dissolved and gelled particles, and also will subsequently aid in the dispersion of insoluble material in the event it is later added. Of course, the dispersing agent may also be added to the polymer solvent as a solution in the polymer solvent itself or as a solution or suspension in a compatible solvent. More rapid mixing of the dispersing agent in the polymer solvent is achieved by such addition. Often the surfactants employed in this invention are solids, and accordingly although the dispersing agent may be dry-blended with the polymer or the insoluble materials prior to addition of these to the polymer solvent, it is obvious that, particularly in these instances, addition of the dispersing agent as a solution or suspension would greatly facilitate processing. The order of addition of polymer and insoluble materials to the polymer solvent is immaterial, however, in the event that the insoluble materials such as pigments are to be added prior to the polymer it is preferred that the dispersing agent be added to the polymer solution prior to addition of the insoluble material or that the dispersing agent be added to the polymer solution simultaneously with the insoluble materials.

The solvents which may be used to dissolve the acrylonitrile polymer and hence to prepare the polymer solutions for spinning polyacrylonitrile are well known to the art. As examples of suitable solvents, there may be mentioned N,N-dimethyl acetamide, N,N-dimethyl formamide, tris(dimethylamido) phosphate, ethylene carbonate, bis(dimethylamido) methane phosphonate, dimethyl-methane phosphate, N-methylpyrrolidone, 1,5-dimethyl-pyrrolidone, butyrolactone, diethylphosphite, and N,N-dimethylmethoxy acetamide. Other solvent systems for acrylonitrile polymer are well known in the art and are set forth in U.S. patents such as U.S. 2,941,972. The most frequently employed solvents, and hence the most preferred, are N,N-dimethyl acetamide and N,N-dimethyl formamide.

The dispersing agents disclosed above, and the novel process of this invention, is generally employed in conjunction with the spinning of acrylonitrile polymers including homopolymers of acrylonitrile and copolymers, and blends containing at least about 75 percent and preferably at least 85 percent by weight polymerized acrylonitrile. Other monomeric polymerizable compounds containing ethylenic unsaturation, and which are copolymerizable with acrylonitrile, may form part of the polymer which may be used in conjunction with this invention. Examples of ethylenically unsaturated monomers copolymerizable with acrylonitrile include the acrylates and alkyl acrylates such as methyl acrylate, ethyl acrylate, butyl acrylate, 2-ethylhexyl acrylate, methyl methacrylate, butyl methacrylate, hexyl methacrylate, and the like; vinyl chloride, vinyl acetate, vinylidene chloride, styrene, and compounds selected from the class consisting of vinyl aryl sulfonic acids and their water soluble salts, N-vinyl pyrrolidone, 2,methyl-5,vinyl pyrrodine, and other

>C=C< containing polymerizable materials such as disclosed in U.S. Patents 2,436,926 and 2,456,360.

The following examples are illustrative.

EXAMPLES 1–4

An acrylic spin dope was prepared by slurrying 785 grams of polymer having a composition of 93 percent acrylonitrile and 7 percent vinyl acetate in 2215 grams of dimethylacetamide solvent to which had previously been added 4 grams of $TiO_2$ pigment. The slurry was heated to 80° C. with agitation to promote solution of the polymer and formation of a viscous spin dope. The solution was wet spun through a 500 hole spinnerette according to standard techniques including extrusion into a coagulating bath of 45 percent water–55 percent solvent, washing, stretching, and drying. Spinnability was evaluated by counting the number of broken filaments in the spin bath and the number of wraps on the washing rolls during a 2 hour test. The fiber was evaluated by determining tenacity, elongation, and color. Color measurements were made on the G.E. Spectrophotometer in accordance with standard procedures. The data is reported below for the sample designated "Control."

The above procedure was repeated with the following alkyl phenol surfactants added to the solvent prior to the addition of the polymer.

Example:                         Percent added (based on polymer wt.)
(1) $C_9H_{19}$—Ar—O—$(CH_2$—$CH_2$—O$)_5$—H     1.0
(2) $(C_6H_{13})_2$—Ar—O—$(CH_2$—$CH_2$—O$)_{10}$—H   0.5
(3) $C_9H_{19}$—Ar—O—$(CH_2$—$CH_2$—O$)_{30}$H     0.5
(4) $C_{12}H_{25}$—Ar—O—$(CH_2$—$CH_2$—O$)_{18}$       1.5

Spinnability and the fiber product were evaluated as described above. The data obtained are presented below:

| Example | Spinnability [1] | | Fiber properties | | | |
|---|---|---|---|---|---|---|
| | Spin bath | Wash rolls | Ten. | Elong. | Bright. | Purity |
| Control | 5 | 1 | 1.6 | 34.8 | 80.5 | 91.5 |
| 1 | 0 | 0 | 1.5 | 30.1 | 82.3 | 92.1 |
| 2 | 1 | 0 | 1.5 | 33.9 | 81.7 | 91.8 |
| 3 | 1 | 0 | 1.6 | 32.1 | 82.0 | 92.0 |
| 4 | 0 | 0 | 1.5 | 34.0 | 81.5 | 91.7 |

[1] Spinnability-number of broken filaments in the spin bath and number of filament wraps on the wash rolls in a 2 hour spinning period.

It is evident from the above data that the spinning performance of the test samples was far superior to that of the control. There is no significant difference between the fiber properties of the samples.

What is claimed is:

1. An acrylonitrile polymer spinning solution of improved homogeneity and spinnability which comprises a polymer selected from the group consisting of homopolymers and copolymers of acrylonitrile containing at least 75 percent by weight acrylonitrile, a solvent for said polymer, and from about 0.1 to 2.0 percent by weight based on the polymer weight of a non-ionic surfactant which is a hydroxypoly(ethyleneoxy)ether of an alkyl phenol.

2. The acrylonitrile polymer solution of claim 1 wherein the surfactant corresponds to the formula

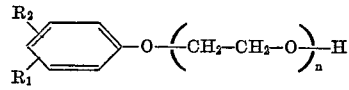

wherein $n$ is an integer from about 2 to about 30, $R_1$ is an alkyl group containing from about 5 to 15 carbon atoms, and wherein $R_2$ is a monovalent radical selected from the group consisting of hydrogen and alkyl groups containing from about 5 to 15 carbon atoms.

3. The acrylonitrile polymer spinning solution of claim 1 which contains from about 0.1 to about 1.0 percent by weight pigment based on the weight of the polymer.

4. The acrylonitrile polymer spinning solution of claim 3 wherein the pigment is titanium dioxide.

5. The acrylonitrile polymer spinning soltuion of claim 1 wherein the solvent is selected from the group consisting of N,N-dimethyl acetamide and N,N-dimethyl formamide.

6. A method of improving the homogeneity and spinnability of an acrylonitrile polymer spinning solution wherein the polymer is selected from the group consisting of homopolymers and copolymers of acrylonitrile containing at least 75 percent by weight acrylonitrile which comprises adding to the solution from about 0.1 to about 2.0 percent by weight of a non-ionic surfactant of the formula

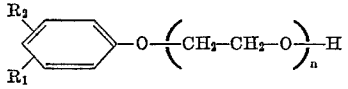

wherein $n$ is an integer from about 2 to about 30, $R_1$ is an alkyl group containing from about 5 to about 15 carbon atoms, and wherein $R_2$ is a monovalent radical selected from the group consisting of hydrogen and alkyl groups containing from about 5 to about 15 carbon atoms.

7. A method of improving the dispersion of polymer and pigment in acrylonitrile polymer spinning solutions and of improving the spinnability thereof wherein the polymer is selected from the group consisting of homopolymers and copolymers of acrylonitrile containing at least 75 percent by weight acrylonitrile which comprises admixing with the polymer solvent prior to addition of polymer and pigment from about 0.1 to about 2.0 percent by weight based upon the weight of the polymer to be added of a non-ionic surfactant of the formula

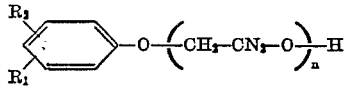

wherein $n$ is an integer from about 2 to about 30, $R_1$ is an alkyl group containing from about 5 to about 15 carbon atoms, and $R_2$ is a monovalent radical selected from the group consisting of hydrogen and alkyl groups containing from about 5 to about 15 carbon atoms.

References Cited

UNITED STATES PATENTS

| | | |
|---|---|---|
| 2,941,970 | 6/1960 | Craig. |
| 3,180,845 | 4/1965 | Knudsen et al _____ 264—182 |
| 3,235,642 | 2/1966 | Blomberg _____ 264—182 |
| 3,277,226 | 10/1966 | Bockno et al. _____ 264—188 |

OTHER REFERENCES

Schwartz and Perry: "Surface Active Agents," Interscience New York (1949), vol. 1, pp. 202–203.

"Titanox White Pigments," Titanium Pigment Corp., New York (1962), pp. 12, 18, and 51.

ALLAN LIEBERMANN, Primary Examiner

W. H. FLETCHER, Assistant Examiner

U.S. Cl. X.R.

260—30.2, 30.4, 30.6, 41; 264—182